(12) United States Patent
Moayyad et al.

(10) Patent No.: US 6,690,400 B1
(45) Date of Patent: Feb. 10, 2004

(54) GRAPHIC USER INTERFACE FOR RESOURCES MANAGEMENT OF SUPER OPERATING SYSTEM BASED COMPUTERS

(75) Inventors: Parviz Moayyad, Houston, TX (US); Schumann Rafizadeh, Highlands, TX (US)

(73) Assignee: Flash Vos, Inc., Houston, TX (US)

( * ) Notice: Subject to any disclaimer, the term of this patent is extended or adjusted under 35 U.S.C. 154(b) by 0 days.

(21) Appl. No.: 09/409,013

(22) Filed: Sep. 29, 1999

(51) Int. Cl.[7] .................................................. G09G 5/00
(52) U.S. Cl. ........................ 345/779; 345/966; 345/775
(58) Field of Search ............................ 345/440.2, 440, 345/779, 781, 810, 828, 841, 902, 966, 771, 804, 775

(56) References Cited

U.S. PATENT DOCUMENTS

| | | | | |
|---|---|---|---|---|
| 5,550,970 A | * | 8/1996 | Cline et al. ................... | 345/161 |
| 5,751,287 A | * | 5/1998 | Hahn et al. ................... | 345/351 |
| 5,945,998 A | | 8/1999 | Eick | |
| 6,133,915 A | * | 10/2000 | Arcuri et al. ................ | 345/334 |
| 6,229,539 B1 | * | 5/2001 | Morcos et al. ............... | 345/352 |

* cited by examiner

Primary Examiner—Kristine Kincaid
Assistant Examiner—Mylinh Tran
(74) Attorney, Agent, or Firm—Kenneth A. Keeling

(57) ABSTRACT

This invention is a Graphic User Interface (GUI) that enables a user to virtualize the system and to define secondary storage physical devices through the graphical depiction of cabinets. The GUI allows the user to assign each cabinet a name, and to define the cabinet by its software, which may include single or multiple operating systems, programs and/or data files. The user is also allowed to manipulate (format, copy, resize, delete, zip) memory partitions in the secondary storage physical devices. The GUI also features graphically editable Internet hyperlinks for communication or remote management. Also, this invention uses a combination of Flash VOS VTOC and ACPI to perform "Cold Swaps" or "Context Switching", which remove one active OS temporarily from all or part of memory and replace it with another active OS in all or part of memory. Information can be shared by multiple Operating Systems through the defined access to Shared Devices or Shared Partitions. The GUI can be used on a variety of computer systems, including multiple operating system and super operating system based computers.

39 Claims, 17 Drawing Sheets

GRAPHIC USER INTERFACE FOR RESOURCES MANAGEMENT OF SUPER OPERATING SYSTEM BASED COMPUTERS

CROSS-REFERENCE TO RELATED APPLICATIONS

This application contains subject matter which is related to the application "Storage Manager for Computer Devices and Method for Manipulating Secondary Storage", Ser. No. 90/283,418, Art Unit 2783, filed on Apr. 1, 1999 by Shumann Rafizadeh, assigned to Flash Vos, Inc.

STATEMENT REGARDING FEDERALLY SPONSORED RESEARCH OR DEVELOPMENT

Not applicable.

TITLE OF THE INVENTION

Graphic User Interface for Resources Management of Super Operating System Based Computers.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

This invention relates generally to computer operating systems, programs and databases, and more particularly, to graphic user interfaces allowing storage management and manipulation of multiple operating systems.

2. Background Information

This invention. relates generally to Graphic User Interfaces (GUI), applicable to various computer operating systems, including Multiple and Super Operating Systems. Specifically, this invention enables such computers to allocate computer resources graphically to one or more operating systems from the same or different software developers and select one or more of the existing environments to boot and run on the computer. Thus the user will be able to operate on the same computer to select multiple applications from various suppliers designed for various stand-alone operating systems or computers.

This invention is particularly useful in conjunction with super or higher level multiple operating systems or multi-boot environments. Super operating systems allow computer users to load multiple operating systems from secondary storage into main memory. This option frees the user from having to purchase software programs that are compatible with only one operating system, and further enables the user to benefit from the strengths of more than one operating system without having to maintain multiple computers.

The cornerstone of a super operating systems GUI is system virtualization, in which physical devices, such as a hard disk and memory, are mapped repeatedly or partitioned into a number of logical devices, each containing a separate operating system. These partitions, however, need to be set up as stable and rigid partitions or mappings so that the operating systems do not mix, intermingle, call on each other, or exchange data, unless the user desires such exchange. It would thus be beneficial to the prior art to provide a GUI mechanism that enables such system management locally or remotely.

Similarly, when certain operating systems, such as the Windows family of operating systems, are loaded from secondary storage to main memory, they are designed to monopolize and re-configure the entire computer system, including secondary storage devices, to suit their particular requirements and parameters. If more than one operating system is to co-exist in the same physical device (as is the case in super operating systems), then such operating systems must be restricted from accessing any portion of the secondary storage address blocks that contain the other operating systems. Therefore, it would be beneficial to the prior art to provide a GUI tool for a user to manage system resources and restrict access to pre-specified resources.

Typically, upon Power On or Restart the computer BIOS transfers (or boots) the single operating system that controls the entire computer resources. These resources are distributed and managed between the applications, users or system invoked for operation. This GUI invention will allow the users to run optionally any application they wish run on their computer, by allowing the user to allocate and manage the system resources between one or more environments, such as cabinets or partitions, using one or more operating systems compatible with that system's hardware.

Furthermore, this GUI will facilitate user access to the Internet with or without traditional browsers by using any applications, both Operating System (OS) present and No-OS stand-alone, capable of communication with the Internet or another remote computer.

This GUI also facilitates local or remote reporting or manipulation of computer system environments, including storage size, user time allocation, user privileges, sharing and security of data, separations of potential users (such as parents and children, teachers and students or classes), different accounting periods and systems.

When different users use a computer system at different times, there is currently no operating-system-independent way to protect the data appropriate for one user from other users.

For instance, parents who use a computer for business purposes cannot, in general, protect their critical data while allowing children to play games on the same system. It would therefore be beneficial to the prior art to provide a GUI Interface for allocation of secondary storage device that can restrict access to a pre-specified section, independent of any operating system, in the form of Virtual Cabinets (Cabinet Records, hereinafter referred to as "Cabinets"). A cabinet is defined herein as a virtual storage device, capable of containing, typically through the use of virtual table of content pointers, all (or partitions of) shared (or non-shared) operating systems, application software (both OS dependent and No-OS embedded), databases and memory.

Prior art known in the industry includes power management and configuration tools and standards such as Advanced Configuration and Power Interface (ACPI), System Table of Contents and Organizations such as Flash Vos Dynamic or Static Virtual Table of Contents (VTOC) and Self Virtualizing Storage. ACPI is a power management specification that enables the operating system to control the amount of power given to each device attached to the computer. With ACPI, the operating system can turn off peripheral devices, such as CD-ROM players, when they are not in use, or can automatically power up the computer as soon as an input device such as a mouse is moved. The Flash Vos Dynamic or Static Virtual Table of Contents (VTOC) is part of a Storage Manager, wherein relevant identifying information is contained for each Partition of secondary storage. At least one Cabinet is created, containing a list of Partitions. Each Cabinet can have a separate list of Partitions, and each Partition can be included in more than one Cabinet. One of the Cabinets is designated as an Active Cabinet. Upon continuation of the boot sequence, the contents (i.e., the list of Partitions within that Cabinet) replace the Partition list of the secondary storage device. If the secondary storage device is bootable, then the Partition within that Cabinet marked as bootable is bootstrapped and is loaded into main memory. The contents of the Partitions and Cabinets may be modified by a user through a graphic user interface, such as described in this invention.

Other related art includes Graphic User Interfaces such as Windows or Xwindows, Bitmap Graphics, VGA, SVGA, User Prompting, Pointing Devices and Internet (including HTML) interfaces, all of which are known by those skilled in the art of computer programming.

Prior art patents include the Eick '998 Patent (U.S. Pat. No. 5,945,998, issued Aug. 31, 1999). The '998 Patent discloses a software apparatus that displays subentities in a computer program graphically, to allow the user to go to a subroutine or subentity without scrolling. The '998 Patent does not teach movement of operating systems within a super operating system environment to specified cabinets, partition modification or remote location control of partition setup.

BRIEF SUMMARY OF THE INVENTION

This invention is a Graphic User Interface that enables a user to virtualize a computer system and to define secondary storage physical devices, in single or multiple/super operating system environments. The system, at its firmware level, enables a user to define and alter the address boundaries of the physical devices and memory. The address boundaries of the physical devices are defined by the address boundaries of one of the logical devices, which has been partitioned or remapped within that physical device. Because such boundary definitions can be implemented at the firmware level of the physical device, every address access request, regardless of its origin and regardless of the origin of the request (i.e., the software component issuing the request), can be subject to the firmware-defined boundaries.

Accordingly, the objectives of this invention are to provide, inter alia, a Graphic User Interface and functions that:

graphically defines multiple functions for allocation of system resources for use in multiple operating systems or no operating system (No-OS or embedded) environments;

graphically defines any size of feature windows and totally hide them if necessary;

save the specific views as needed for all function windows;

enable restricted partitioning and supports storage virtualization;

allows the remote management of any of the operating systems through selection of any bootable cabinet or partition upon invoking the OS Manager component of the GUI; and enables such partitioning and supports such storage virtualization regardless of the origin of an address request and independent of any operating system.

The functions are performed in the following organizations:

System and OS Functions
  Partition Tools and Functions:
    Create, Delete, Format, Copy, Resize, Zip or Pack, Set Bootable
  Cabinet Tools and Functions:
    List, View, Default Boot, Boot, Create, Delete, Virtualization, Set Attributes, Invoke Cabinets
  Operating Systems Tools and Functions:
    Boot Option, Size, Logo, Security, Resources and Management.
Internet Functions
  This GUI window allows the user to use the Internet to remotely select other systems and organizations that are frequently accessed to be tailored and available for direct communication with or without requiring a specific (OS Dependent or Independent) browser or link up program.
User Functions
  This window allows the user to select his most commonly used applications regardless of the specific OS or No OS environment and quickly access them from the GUI.
Flash Vos Site access
  This GUI option allows users to access the Flash Vos Web site for update of their software, purchase or license of additional software and or information and products.
Management Functions
  The GUI provides a Local and Remote Management Option for any number of the supported OS environment(s). Examples of such support management tools include Intel's Landesk, CA's Unicenter, Flash Vos and Norton Utilities.

Other objects of the invention will become apparent from time to time throughout the specification hereinafter disclosed.

NOTE: The Figures provided in this disclosure may include trademarks belonging to entities other than the present inventor. These trademarks are included only for representational descriptions, and do not form in part or in whole any disclosure or claim.

DETAILED DESCRIPTION OF THE INVENTION

The Graphic User Interface ("GUI") of the present invention enables a user to allocate and manage the resources of a computer system by defining one or more cabinets, each cabinet containing one or more partitions of one or more existing software and/or data. Examples of such existing software includes operating systems ("OS"), OS dependent programs and No-OS (self-contained, embedded OS) programs. This resource allocation and management is performed graphically with a pointing device and/or keyboard, and is referred to as Flash Vos GUI 10 or FVOS GUI 10 for short. FVOS GUI 10 also allows users to tailor the computer system to be managed locally or remotely, manipulate and share partitions, cabinets and files and their characteristics or operating environments. For the purposes of this invention and disclosure, the terms "Virtual Cabinet", "Cabinet Record" and "cabinet" are synonymous. A cabinet is defined herein as a virtual storage device, capable of containing, typically through the use of virtual table of content pointers, all (or partitions of) shared (or non-shared) operating systems, application software (both OS dependent and No-OS embedded), databases and memory. This invention provides, inter alia, means for manipulating cabinets. This manipulation comprises adding partitions, deleting partitions, naming the cabinet, assigning an icon to the cabinet, configuring partitions in the cabinet, defining user access, defining remote management functions and booting the cabinet.

FVOS GUI 10 is portable, in that it is capable of being executed on various types of data processing systems without converting it to a different language and with little or no modification.

FVOS GUI 10 uses a combination of Flash VOS VTOC (Virtual Operating System—Virtual Table of Contents) and Advanced Configuration and Power Interface (ACPI) to perform "Cold Swaps" or "Context Switching." A Cold Swap removes one active OS temporarily from all or part of memory and replaces it with another OS in all or part of memory with another active OS, and further allows sharing of information by Shared Device or Shared Partitions among multiple Operating Systems.

FVOS GUI 10 provides access restriction for privileged or various users by password and virtual boundary establishments.

Figure 1:
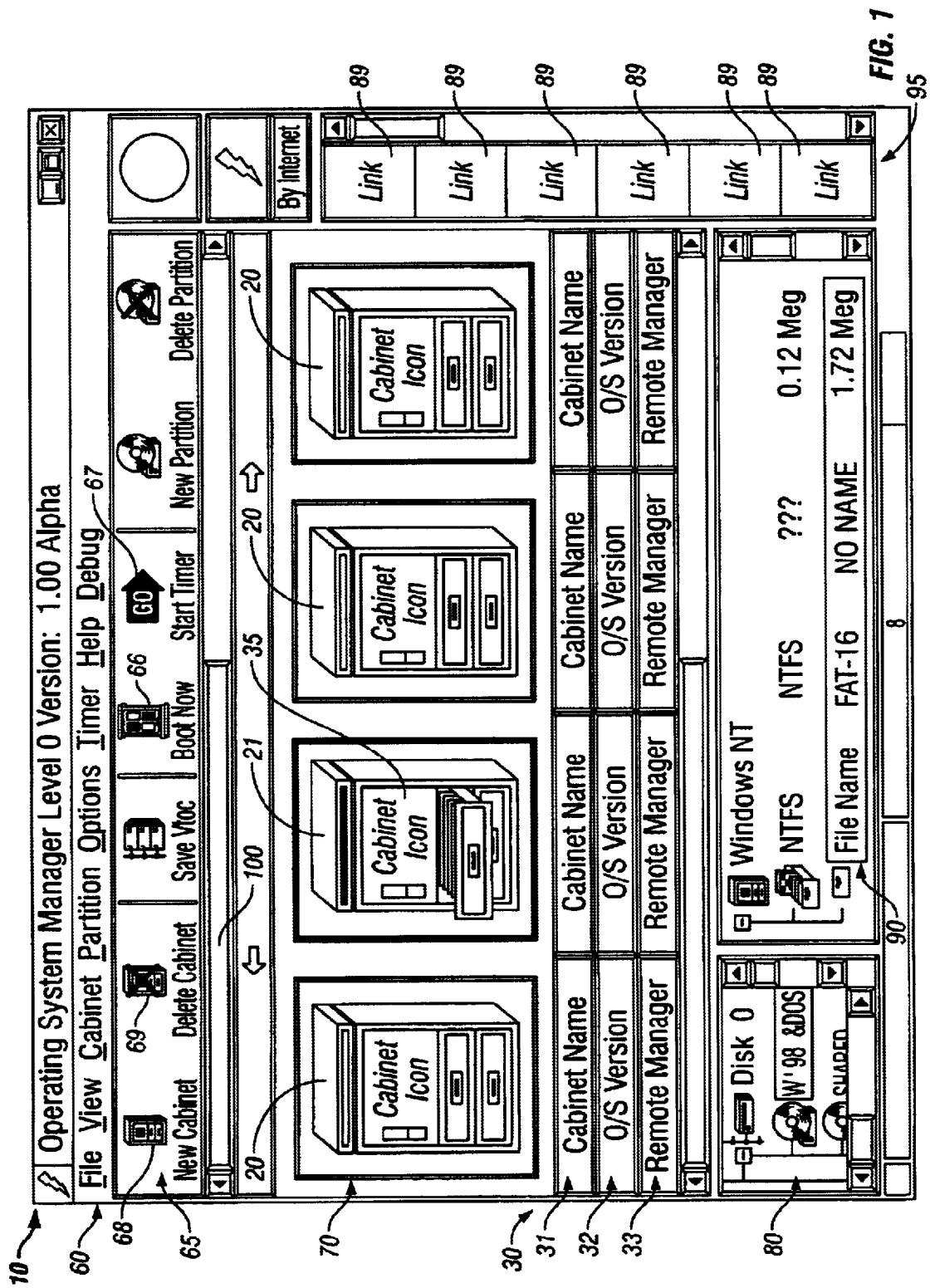
FIG. 1 depicts the Boot View of the FVOS GUI.

FIG. 1 depicts the Boot View of FVOS GUI 10. Depicted in FIG. 1 are typical components of FVOS GUI 10, comprising Main Pull Down Menu Bar 60, Main Toolbar 65, Cabinet Selection Button Bar 70, Cabinet Properties Window 30, Secondary Storage Partitions Window 80, Active Selected Cabinet Visible Partition Window 90 and URL Internet Button Bar 95.

Figure 2:
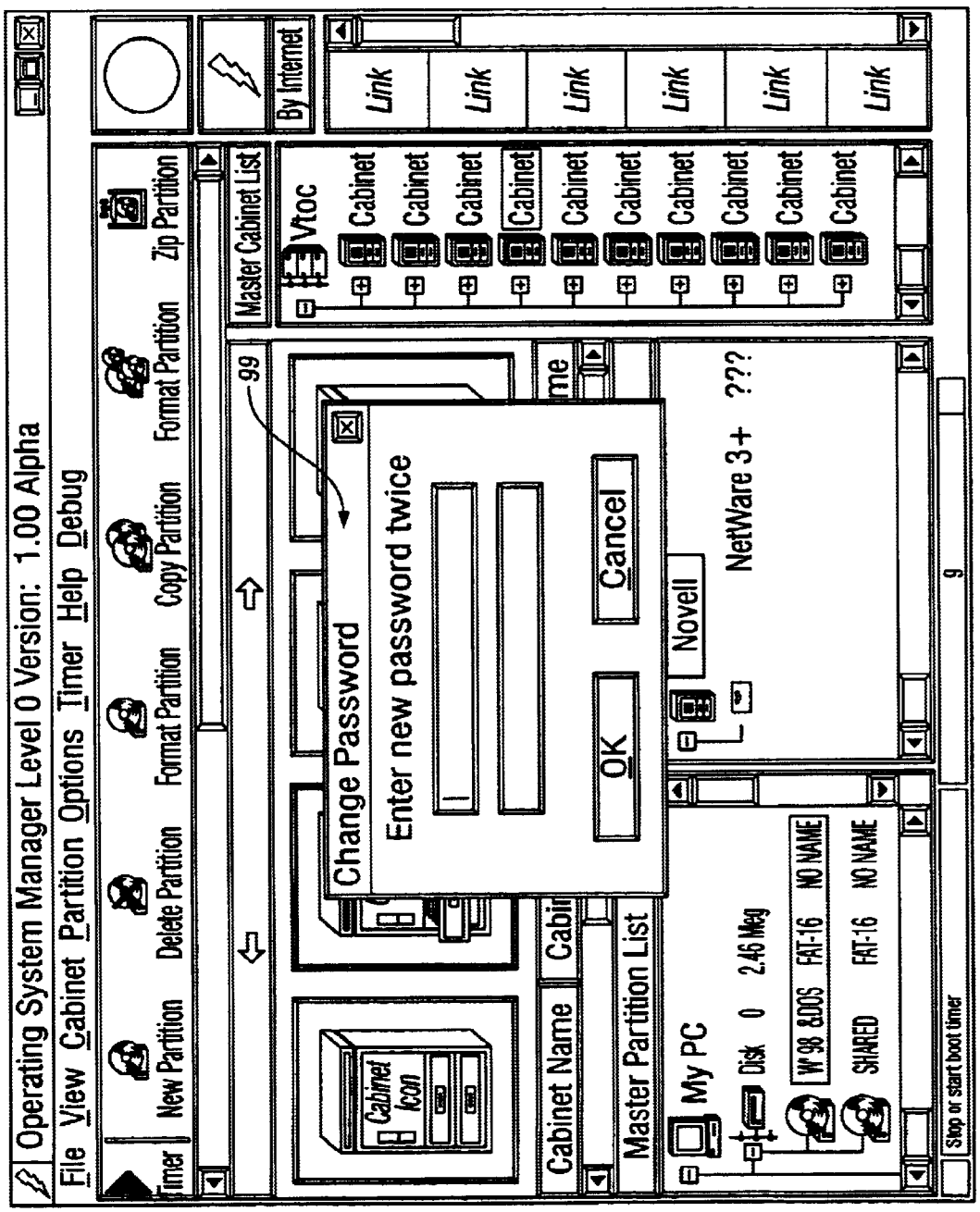
FIG. 2 depicts the Super User Password Change Window of the FVOS GUI.

In the preferred embodiment, many of the functions performed by FVOS GUI 10 are allowed only for "Super Users", who must log into FVOS GUI 10 by verifying a password, such as under the "Options" pull-down menu of Main Pull Down Bar 60. In an alternative embodiment, Main Pull Down Bar 60 can be an alternative menu bar, comprising devices such as link buttons, hot keys, function keys or other function call-ups known in the industry. The Super User can change the password through Password Change Window 99, as depicted in FIG. 2. Password Change Window 99 is typically activated through the "Options" pull down menu of Main Pull Down Bar 60, by selecting the "change password" option and then verifying the current password. A Super User is able to create new memory partitions, delete partitions, format partitions, copy partitions, resize partitions, zip partitions, create and edit cabinets and change passwords. In an alternative embodiment, any user may perform any of the functions afforded by the design of FVOS GUI 10, including all described as being used by a Super User.

In FIG. 1, Cabinet Buttons 20 represent inactive cabinets, which contain operating systems, programs and data not in current use by the computer. Cabinet Button 21 represents an active cabinet, which contains the selected software and data files, which may or may not be running. FIG. 1 further depicts Cabinet Property Windows 30, within which are Cabinet Name Window 31, Primary Operating System Version Window 32, and Remote Manager Window 33 for each cabinet.

Figure 3:
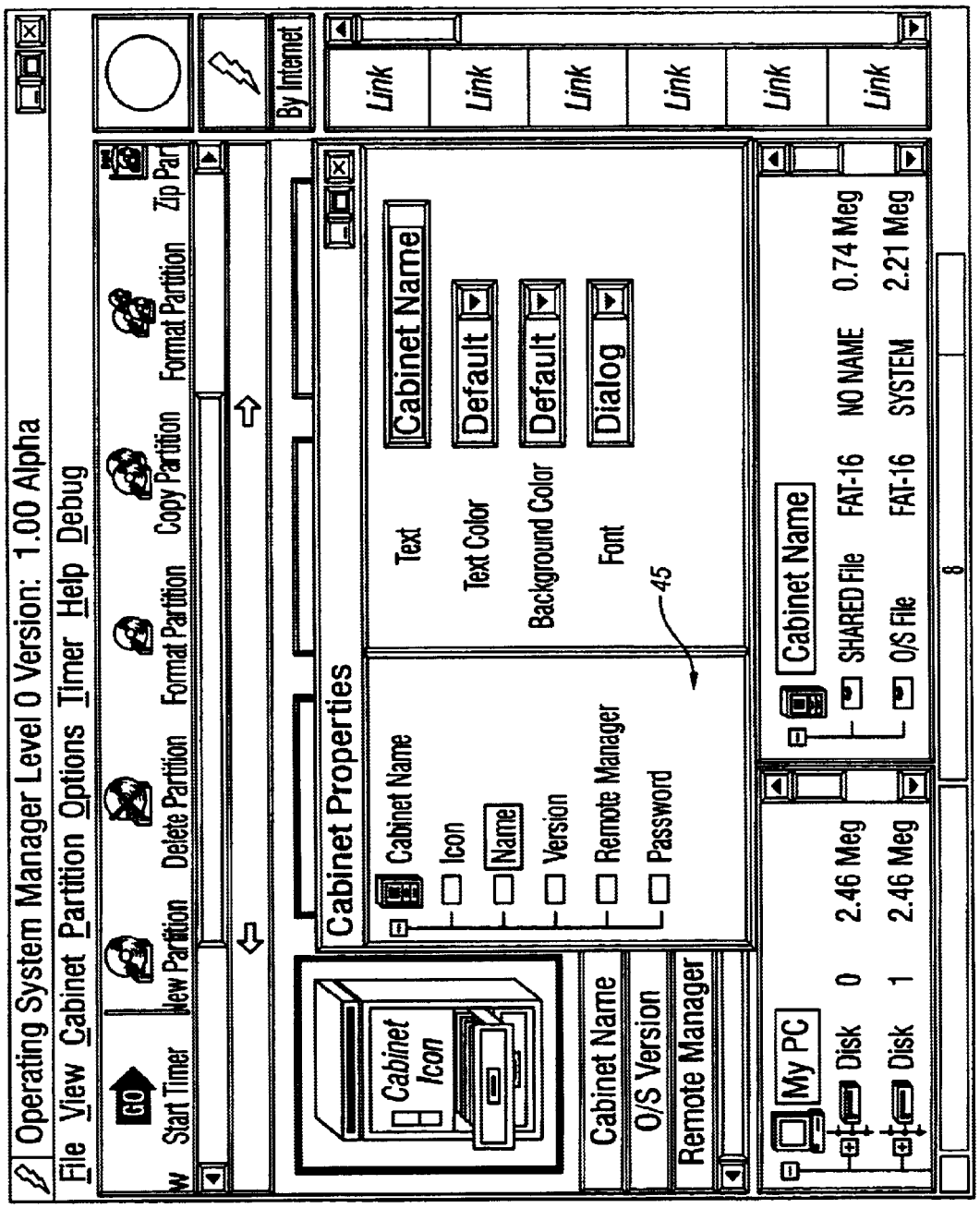
FIG. 3 depicts the Cabinet Name Editor of the FVOS GUI.

The name of each cabinet named in Cabinet Name Window 31 is chosen by the "Super User" and is arbitrary. In the preferred embodiment, the name selected will be that of the primary operating system contained in the cabinet. The name is editable through Cabinet Name Editor 45, depicted in FIG. 3. In Cabinet Name Editor 45, the "Super User" types in the name text via a keyboard or similar input device. The Text Color, Background Color and Font for the cabinet name depicted in Cabinet Name Window 31 are selected in Cabinet Name Editor 45 from drop-down menus using a standard pointing device such as a mouse.

Figure 4:
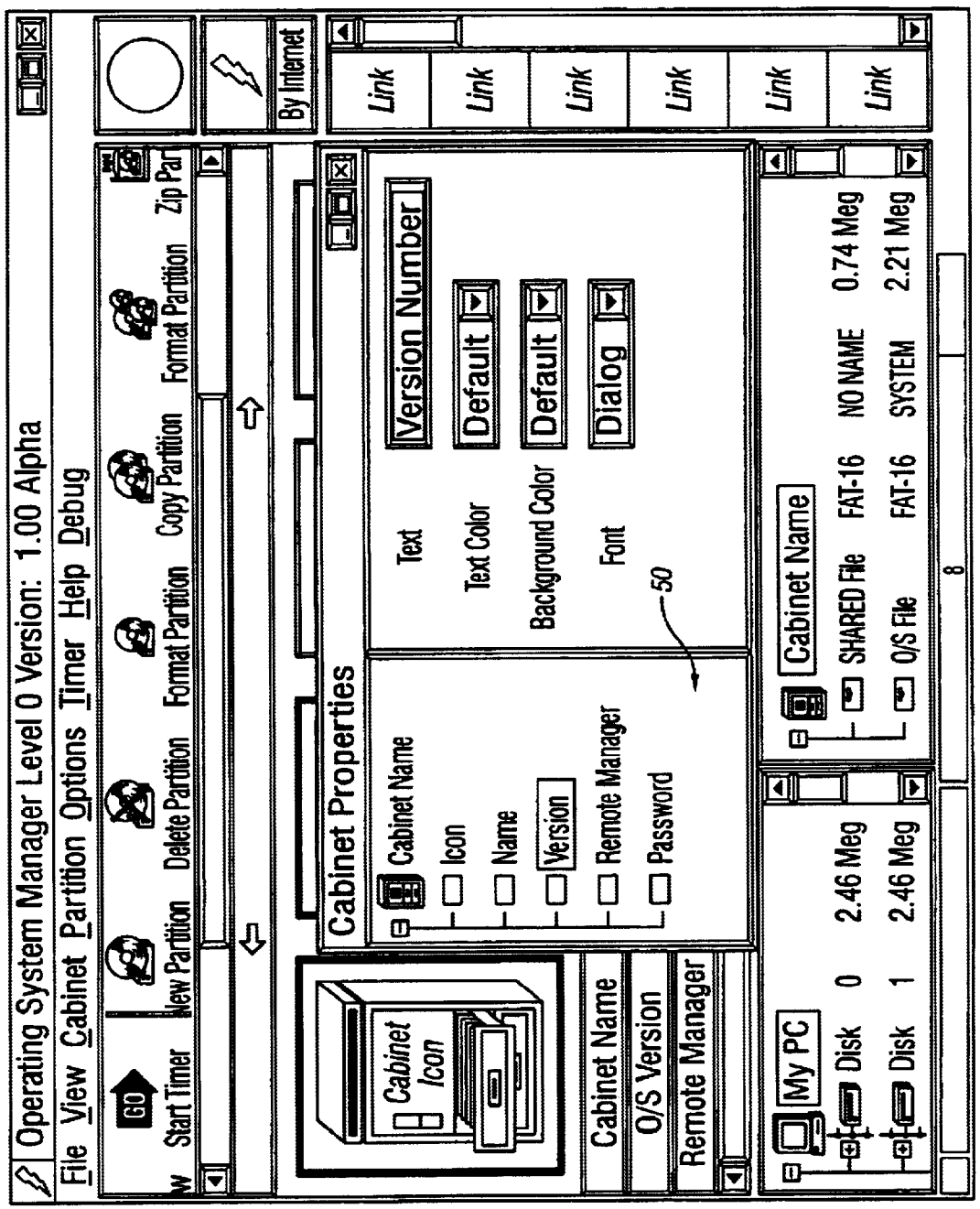
FIG. 4 depicts the Primary OS Version Editor of the FVOS GUI.

The text shown in Primary Operating System Version Window 32 identifies the release version of the primary operating system contained in the active cabinet. The text shown is editable by the "Super User" through the Primary Operating System Version Editor 50, depicted in FIG. 4. In Primary Operating System Version Window 50, the user types in the name text via a keyboard or similar input device. The Text Color, Background Color and Font for the cabinet name depicted in Primary Operating System Version Window 32 are selected in Primary Operating System Version Editor 50 from drop-down menus using a standard pointing device such as a mouse.

Figure 5:
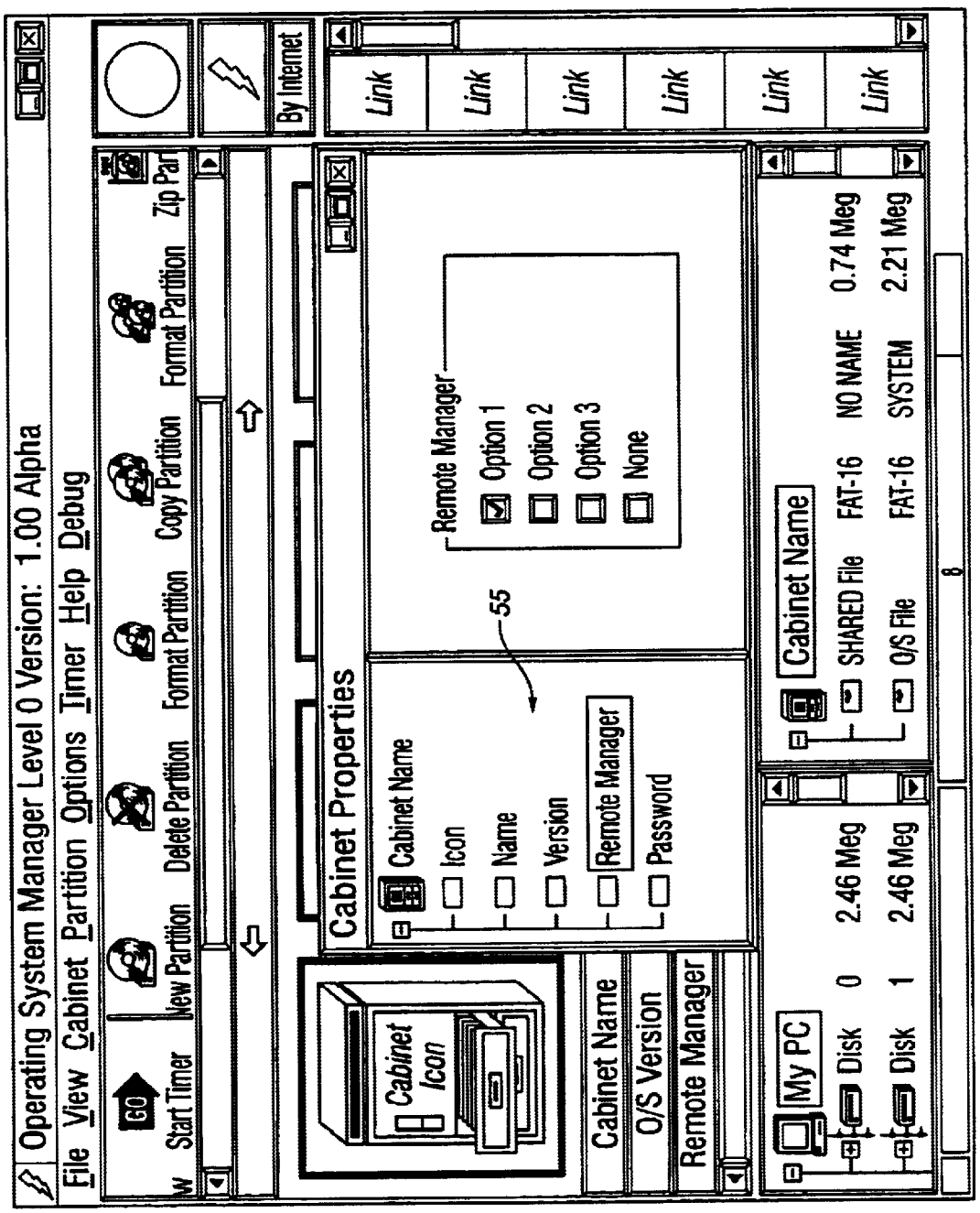
FIG. 5 depicts the Remote Manager Editor of the FVOS GUI.

The location of the remote manager depicted in Remote Manager Window 33 can be edited by the "Super User" through the Remote Manager Editor 55, depicted in FIG. 5. The Remote Manager location is selected from a check box, radio button or similar icon identified with a remote manager. The Remote Manager has the capability of remote management of any of the operating systems through selection of any bootable cabinet or partition upon invoking the OS Manager component of the Virtual Operating System manipulated by FVOS GUI 10.

Figure 6:
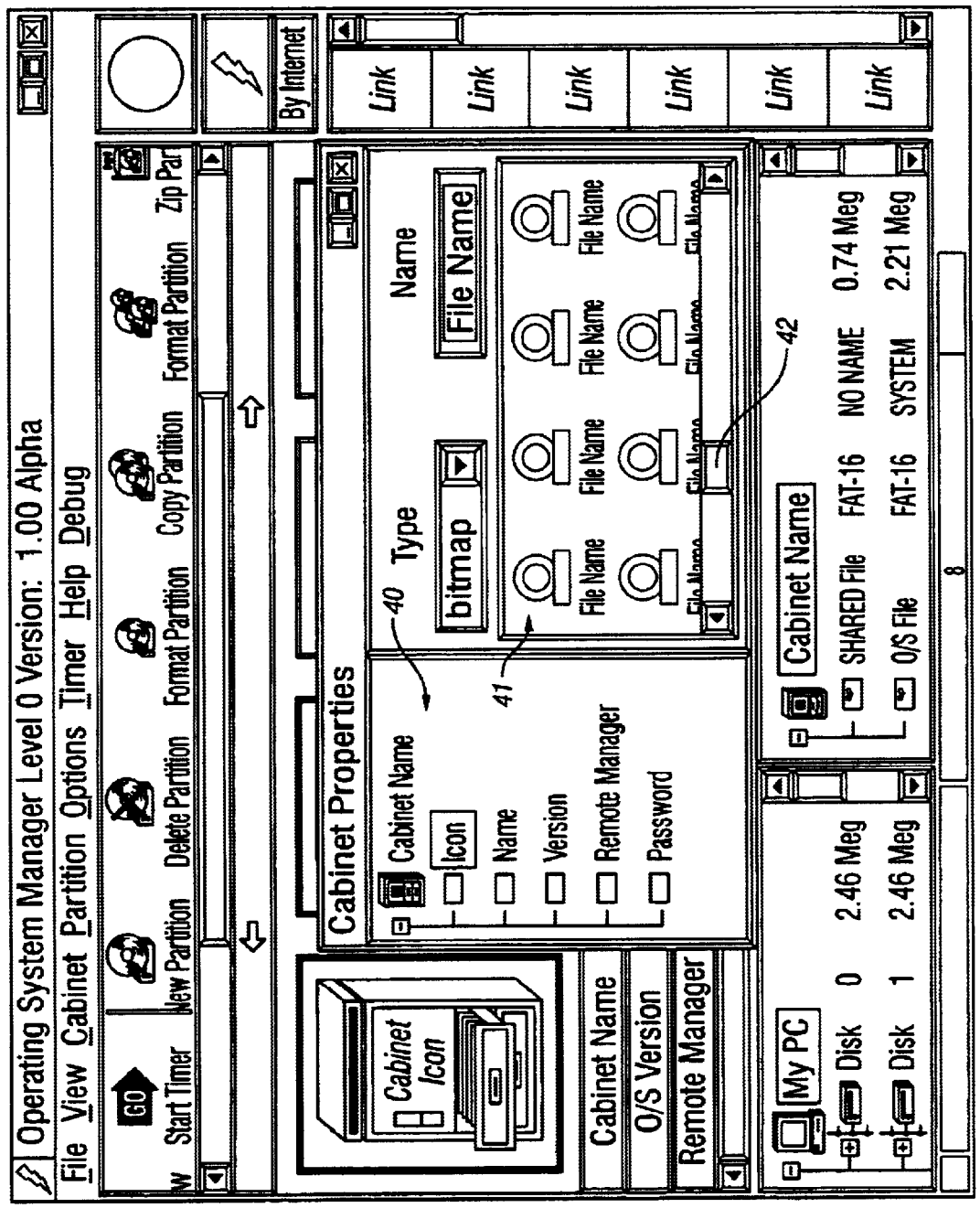
FIG. 6 depicts the Cabinet Icon Editor of the FVOS GUI.

Each Cabinet Identifying Icon 35, FIG. 1, can be edited by the "Super User" using Cabinet Icon Editor 40, depicted in FIG. 6. To change Cabinet Identifying Icon 35, the user double clicks a pointing device, such as a mouse, while the cursor is placed over the desired icon from Window 41. This action places the new Identifying Icon 35 graphic on the selected cabinet 4 button. Additional icon choices are displayed by scrolling scroll bar 42.

Figure 7:
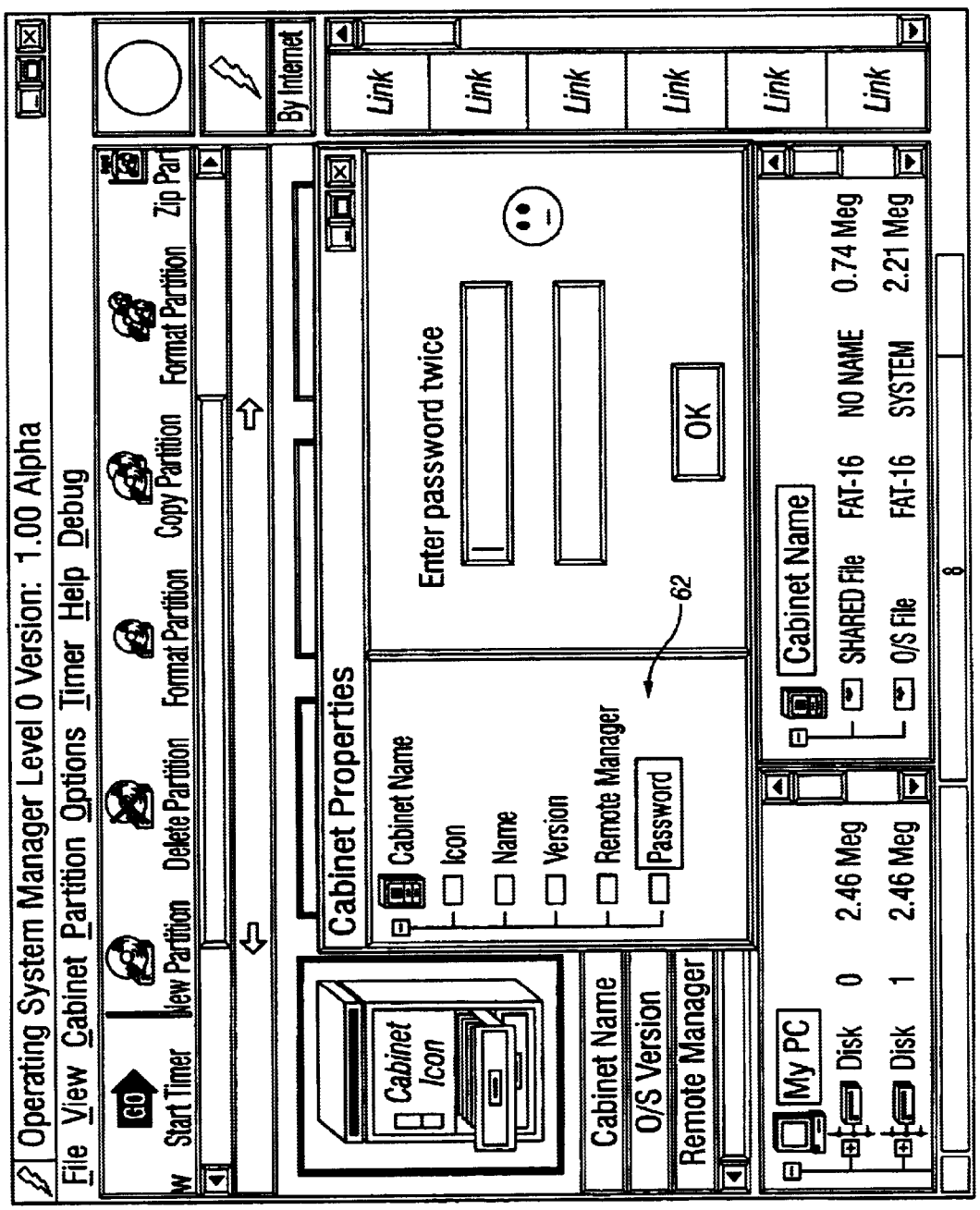
FIG. 7 depicts the Cabinet Password Change Editor of the FVOS GUI.

In the preferred embodiment, each Cabinet is access controlled through the use of a password. This password can be changed by a user or "Super User" through Cabinet Password Window 62, depicted in FIG. 7.

Figure 8:
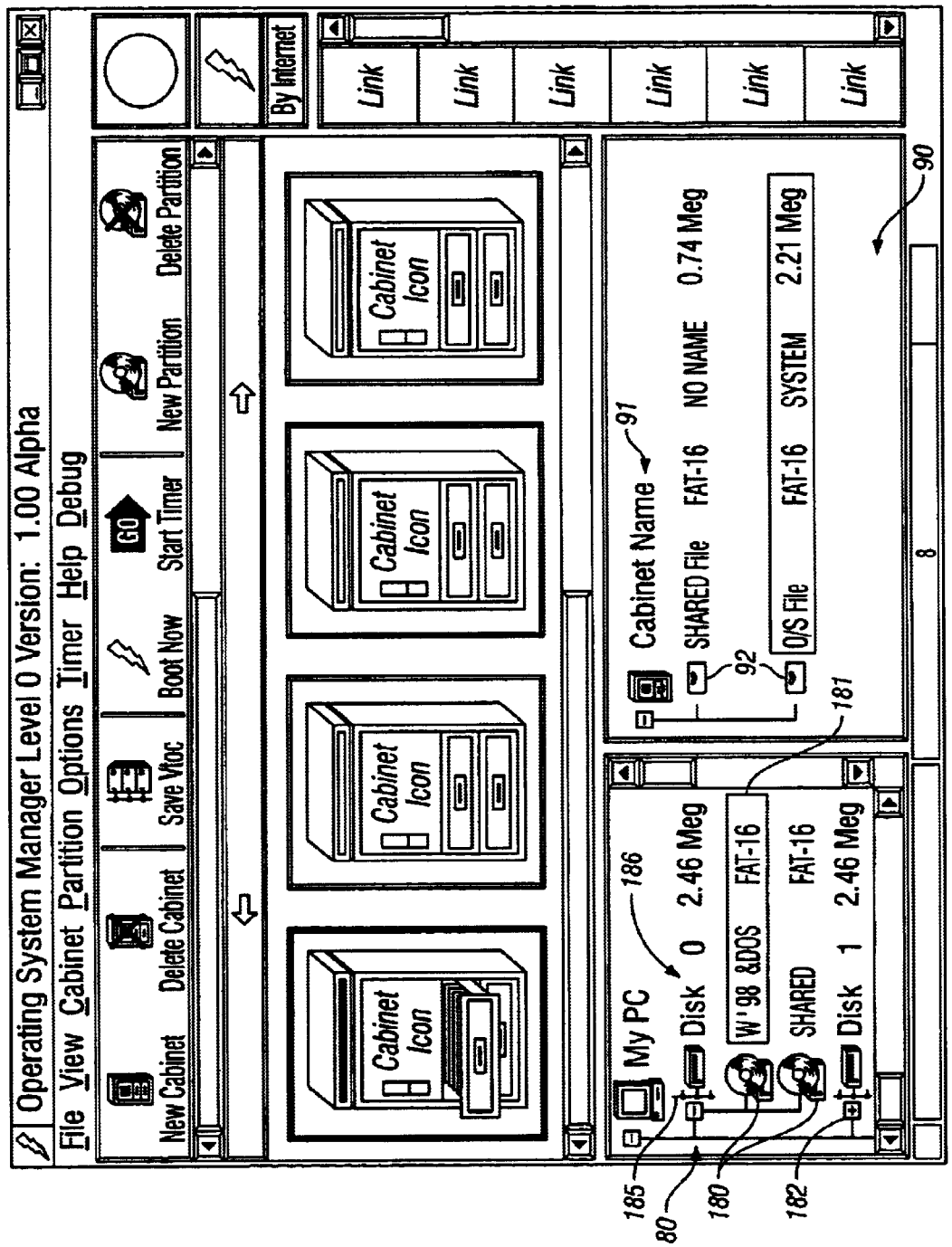
FIG. 8 depicts the Active Contents Window of the FVOS GUI.
Figure 9:
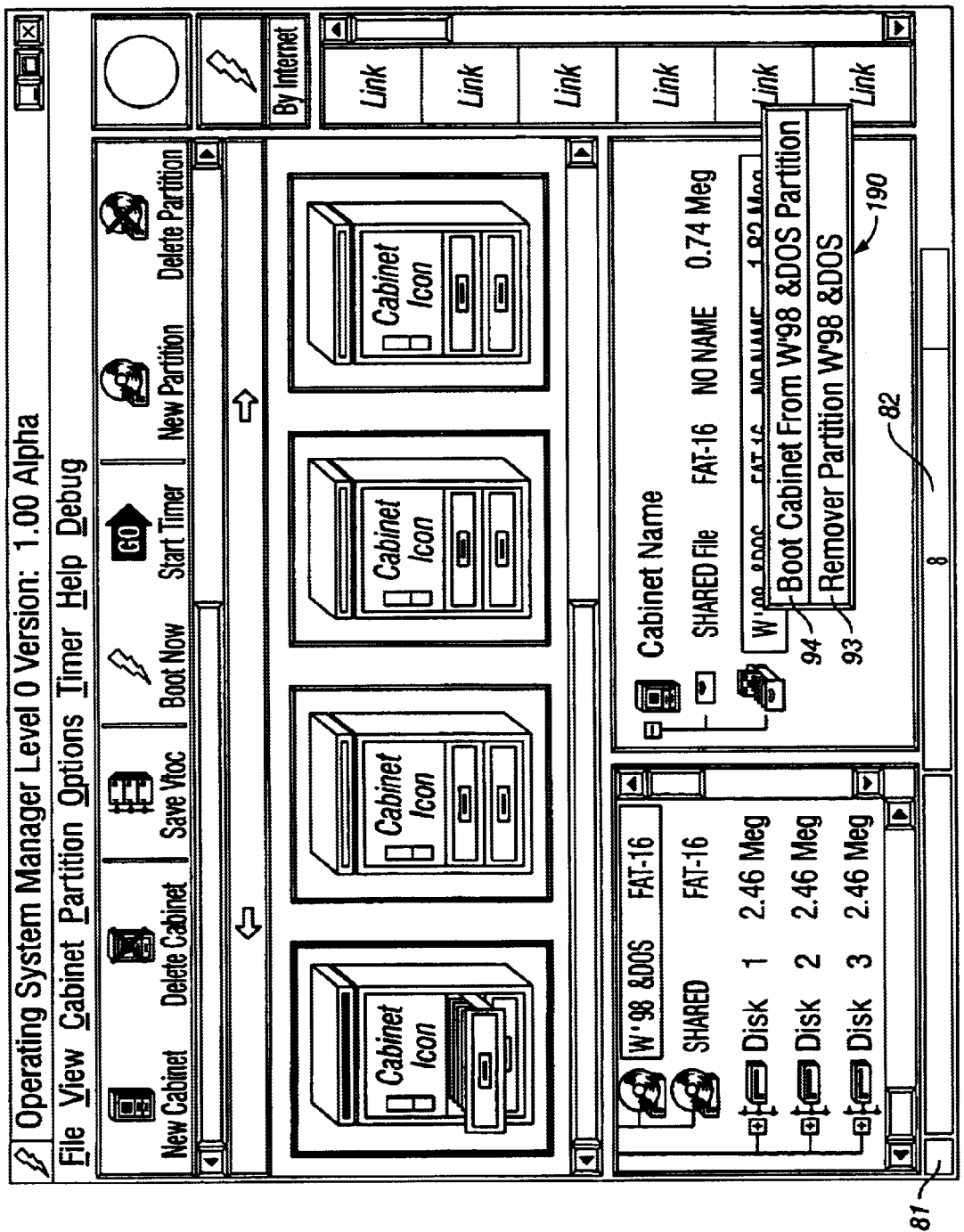
FIG. 9 depicts the Boot Cabinet Button of the FVOS GUI.
Figure 10:
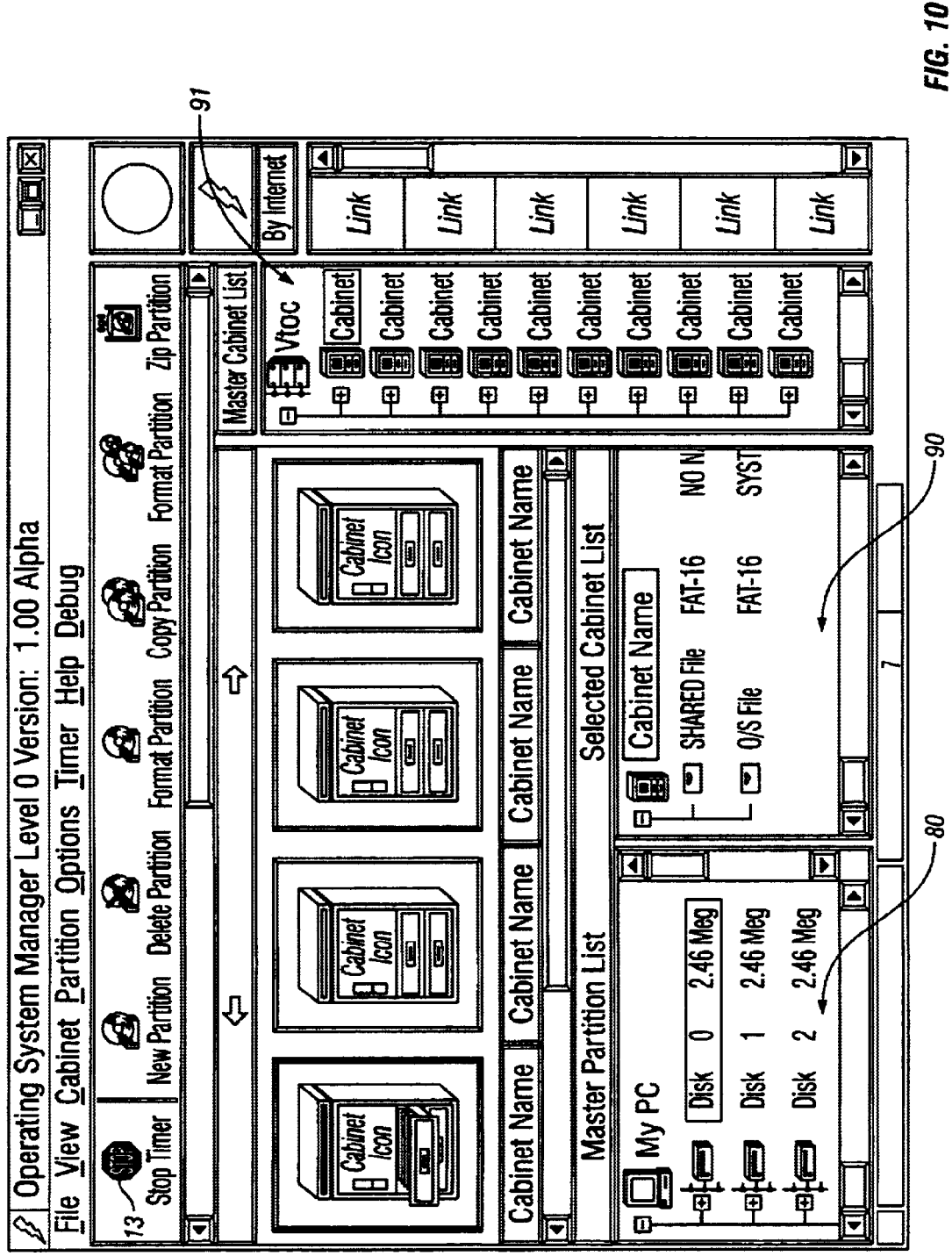
FIG. 10 depicts the Configuration View of the FVOS GUI.

As stated above, Cabinet Button 21 depicts an active cabinet, whose contents, which may include operating systems, partitions, software and data, can be manipulated (added, removed, renamed, relocated in memory) by FVOS GUI 10. The contents of the active cabinet are depicted in FIG. 8 in Active Selected Cabinet Visible Partition Window 90. The contents of the all secondary storage devices found in the computer system are depicted in Secondary Storage Partitions Window 80 as Secondary Storage Icon 180 and Secondary Storage Text Descriptor 186. The partitions of each secondary storage device are depicted with icons 180 and text descriptors 181, viewable through content button expanders 182. The partitions can be virtually copied from the secondary storage to the active cabinet by an input device operation, such as "click and drag" movement using a pointer device such as a mouse, or by double clicking using such pointer device. The pointer device is placed over either icon 180 or text descriptor 181 in Secondary Storage Partitions Window 80, and the "click and drag" or double clicking operation of the pointer device places the partition described by icon 180 and text descriptor 181 into the active cabinet. As depicted in FIG. 9, the partition can be removed from the active cabinet by "right clicking" a pointer device over the selected partition, evoking cabinet button 190, and selecting Remover 93. In the preferred embodiment, the Configuration View shown in FIG. 10 allows for the same functions without being limited to the Selected Cabinet. Partitions are moved from the Secondary Storage Partitions Window 80 to the desired Cabinet depicted in Master Cabinet Visible Partition Window 91. Master Cabinet Visible Partition Window 91 depicts all cabinets, both selected (active) and non-selected (inactive), booted and non-booted.

Figure 15:
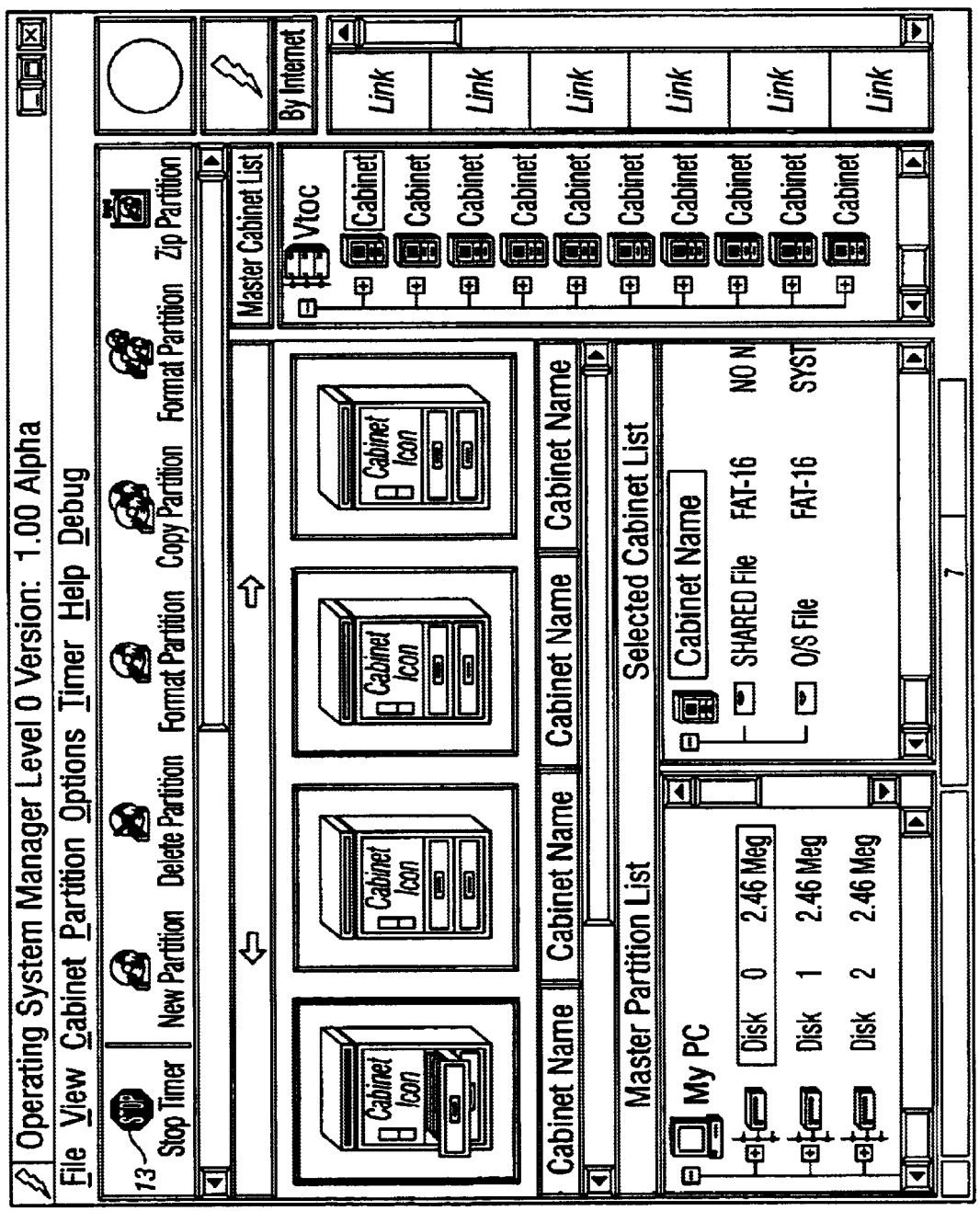
FIG. 15 depicts FVOS GUI with the Boot Stop Button active.

When FVOS GUI 10 is initiated, an operating system (OS) will boot up automatically within a defined time, such as 10 seconds, after FVOS GUI 10 initiation (unless Stop Timer Button 13, FIG. 15, is clicked using a standard pointer input), when Boot Now Button 66, FIG. 1, is selected with a standard pointer input device such as a mouse, or when selected Cabinet Button 21 is double-clicked. In FIG. 9, the Timer is graphically represented by Digital Countdown-Timer 81 and Bar Countdown Timer 82. The OS that boots up will be either the default OS or a selected partition OS from the Active Cabinet. The default OS is defined either in Cabinet Name Window 31 and Primary Operating System Version Window 32, or is selected in the Active Selected Cabinet Visible Partition Window 90 by "right clicking" using a standard pointing device on the depicted partition, and selecting Boot Cabinet Button 94, FIG. 9. Boot Cabinet Button 94 can be selected at any time the cabinet is active, including when another operating system partition in Active Cabinet is running, allowing "Cold Swaps" of operating systems. Alternatively, any cabinet, selected or non-selected, can be selected from a cabinet in Master Cabinet Visible Partition Window 91, and booted up at any time using Boot Cabinet Window 94.

Figure 11:
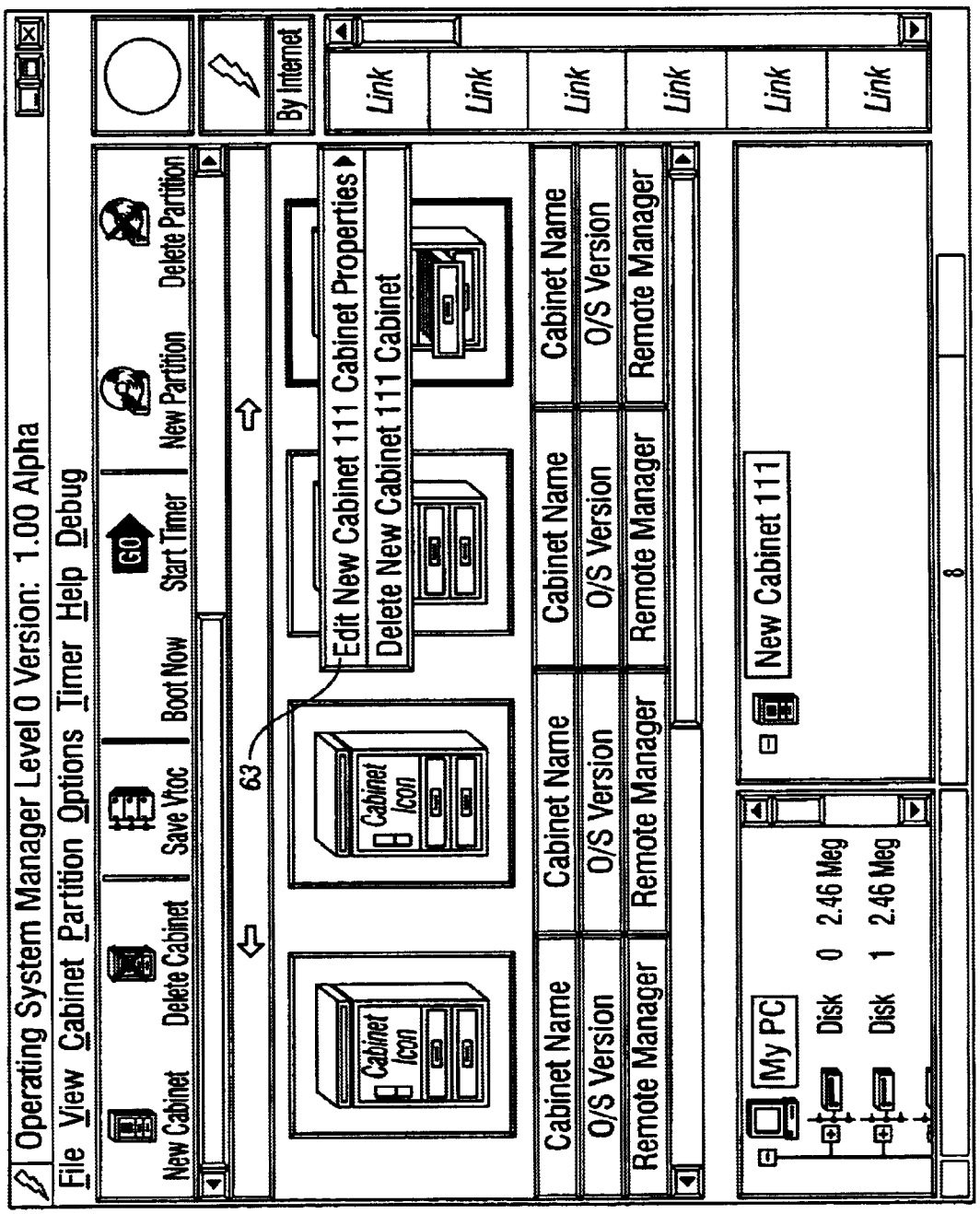
FIG. 11 depicts the Cabinet Editor Button of the FVOS GUI.
Figure 12:
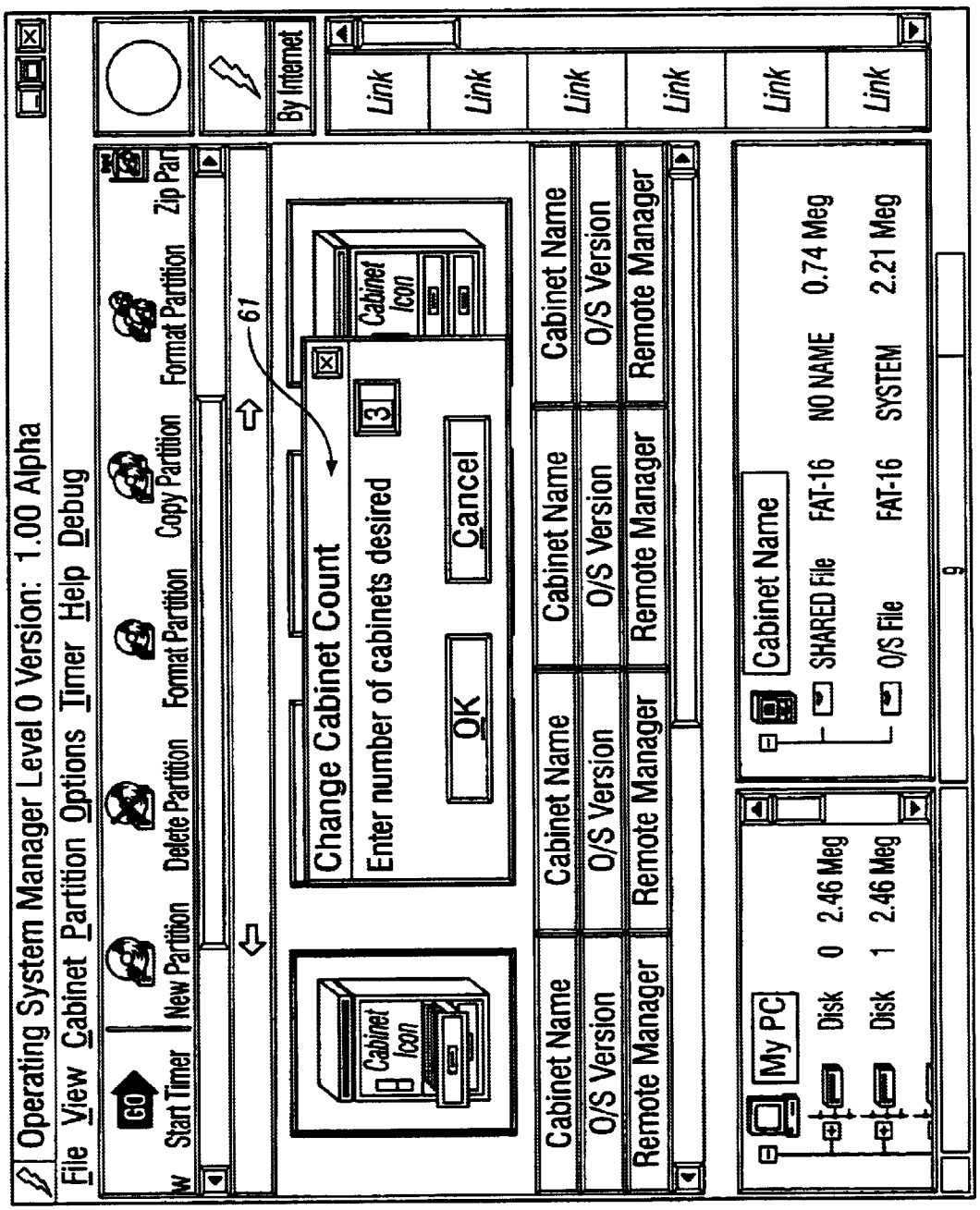
FIG. 12 depicts the Change Cabinet Count Window of the FVOS GUI.

New cabinets can be added either by using New Cabinet Button 68, FIG. 1, or choosing the "New" option under the "Cabinet" pull-down menu from Main Pull Down Menu Bar 60, FIG. 1. Cabinets can be deleted either by using Delete Cabinet Button 69 or choosing the "Delete" option under the "Cabinet" pull-down menu from Main Pull Down Menu Bar 60. As depicted in FIG. 11, "right clicking" with a pointer input device such as a mouse brings up New Cabinet Button 63, which allows the Super User to delete or edit the new cabinet through Cabinet Icon Editor 40, Cabinet Name Editor 45, Primary Operating System Version Editor 50, and/or Remote Manager Editor 55. The total number of Cabinets allowable is controlled by the "Super User", by selecting from Main Pull Down Menu Bar 60 the pull-down menu "Options", then "Super User" and then "Set Cabinet Limit." Change Cabinet Count Window 61, as depicted in FIG. 12, allows the Super User to define the number of Cabinets.

Figure 13:
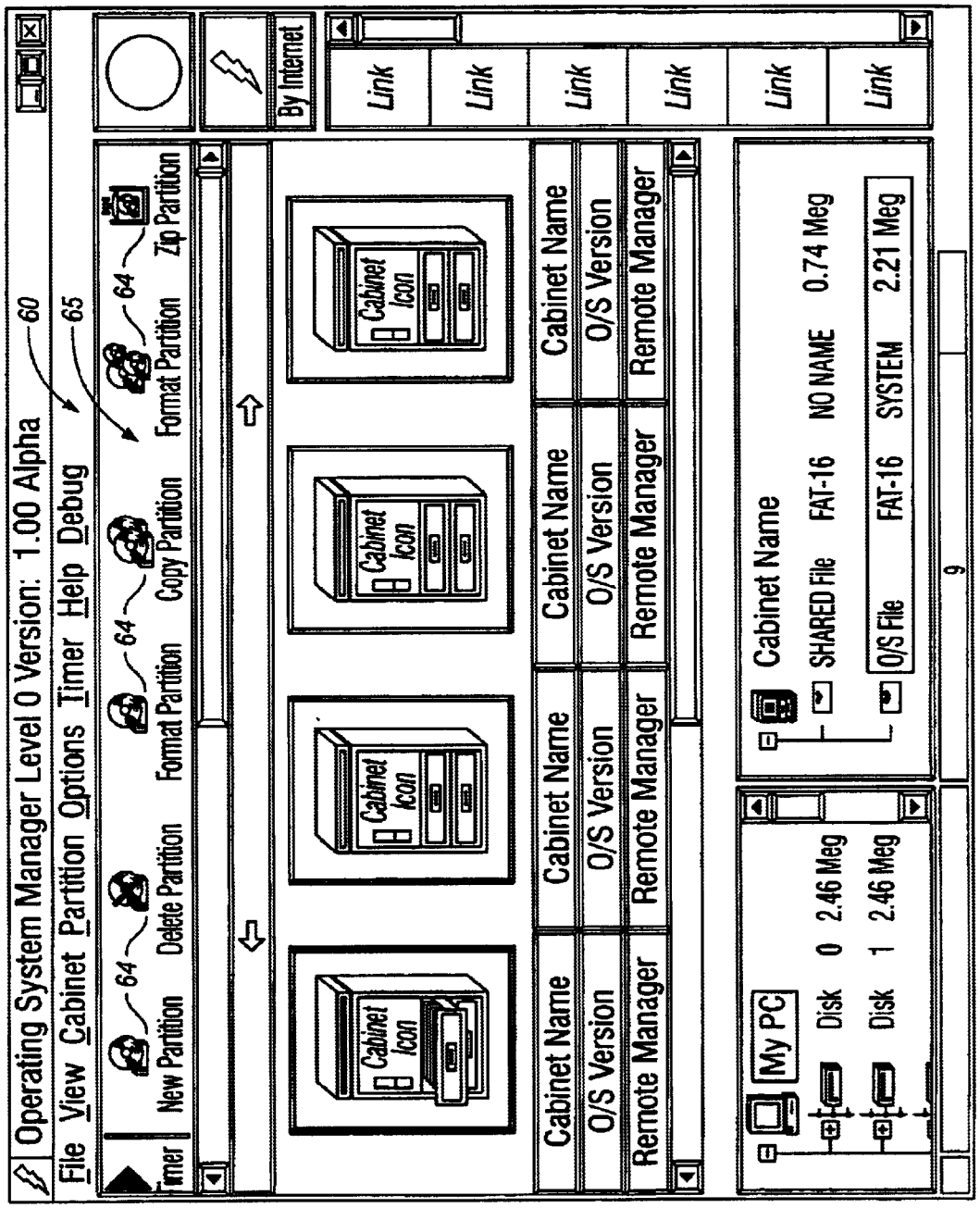
FIG. 13 depicts the Partition Toolbar of the FVOS GUI.

Partitions can be edited either with options available from the "Partition" pull-down menu from Main Pull Down Menu Bar 60, or by using Partition Buttons 64 on Main Toolbar 65 depicted in FIG. 13. Partition functions available include creating new, deleting, formatting, copying, resizing and zipping partitions.

Figure 16:
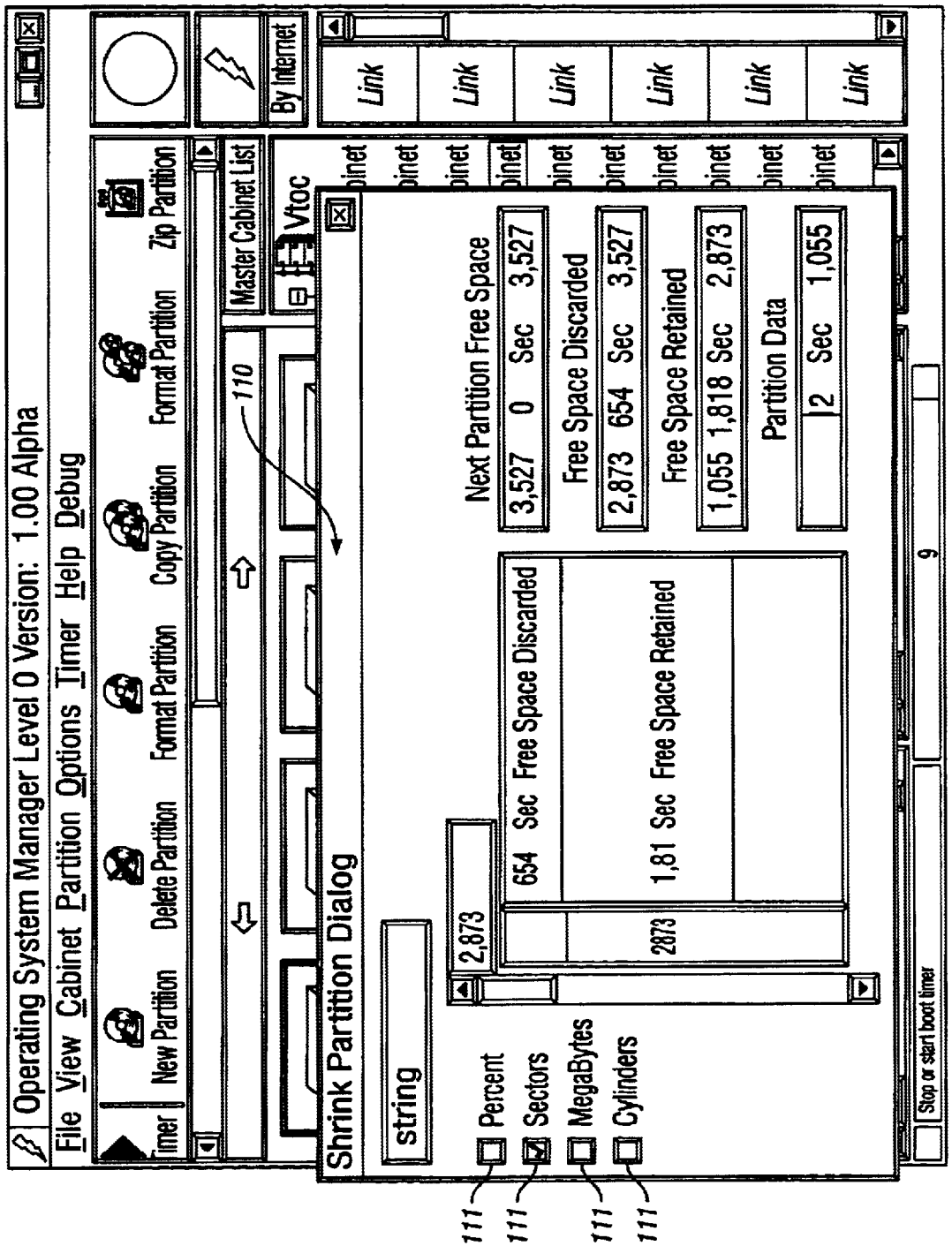
FIG. 16 depicts the Partition Resizing Window of FVOS GUI.

Resizing Partition Window 110 is called by clicking on the Resize Partition button in Main Toolbar 65. As seen in FIG. 16, Resizing Partition Window 110 allows the user or Super User to resize the allocated memory space in the partition by Partition Data, Free Space Retained and Free Space Discarded. The allocations are in the format chosen by the user from Buttons 111, which enable the display of allocations in percentage, sectors, megabytes or cylinders of the total partition.

Figure 17:
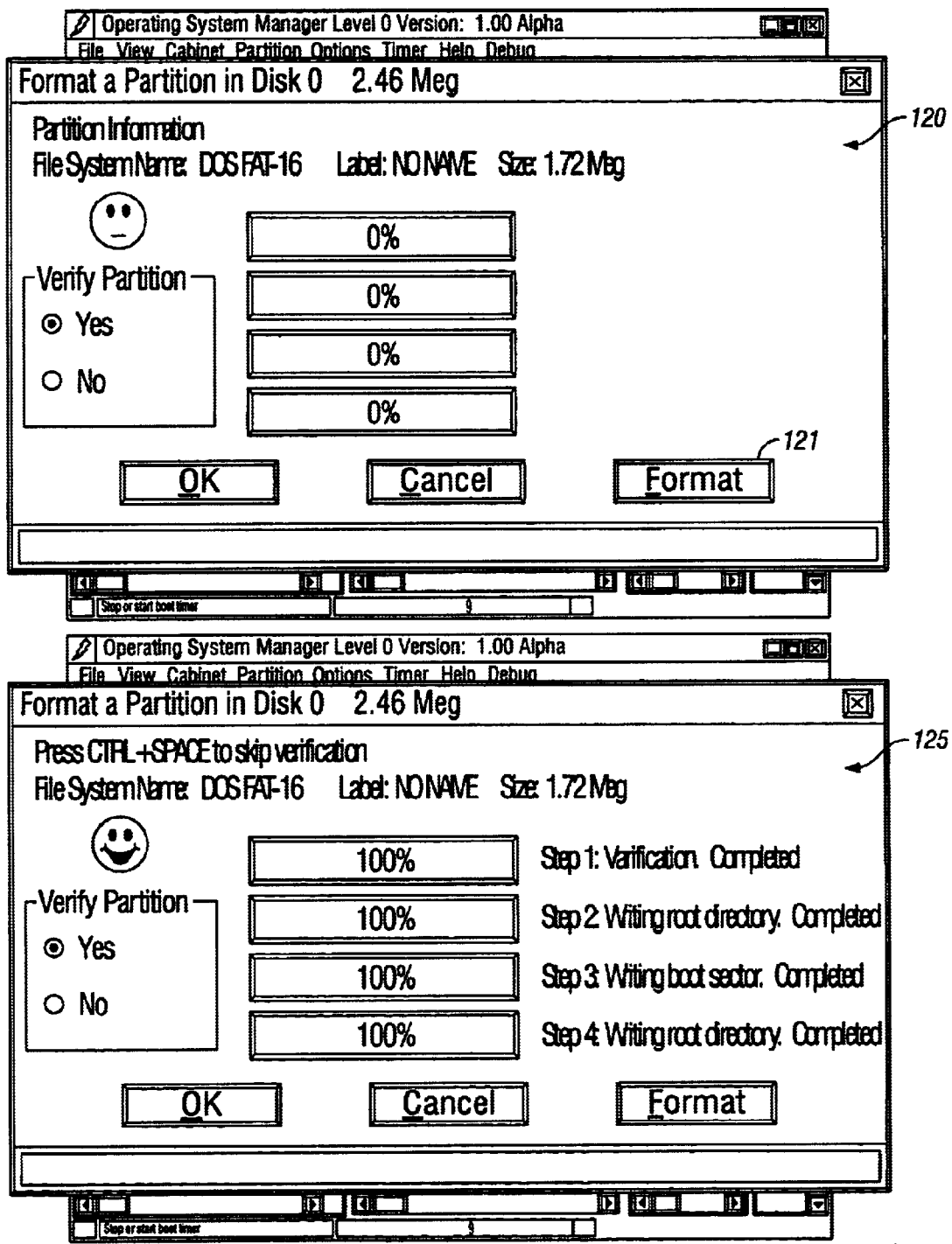
FIG. 17 depicts the Partition Formatting Window of FVOS GUI.

Formatting the partition is performed through Partition Formatting Window 120, which is called up either through clicking on the Format Partition button in Main Toolbar 65, or using the "Partition" pull-down menu in Main Pull Down Menu Bar 60, and selecting the "Format" option. By clicking Format Button 121, depicted in FIG. 17, the Partition is formatted. The completed results are shown in Partition Format Window 125.

When the Cabinet configurations are set in the desired manner, FVOS GUI 10 is saved using Save VTOC Button 100, FIG. 1. The saved configuration will then be the initial configuration when FVOS GUI 10 is initiated, until the user reconfigures FVOS GUI 10.

Figure 14:
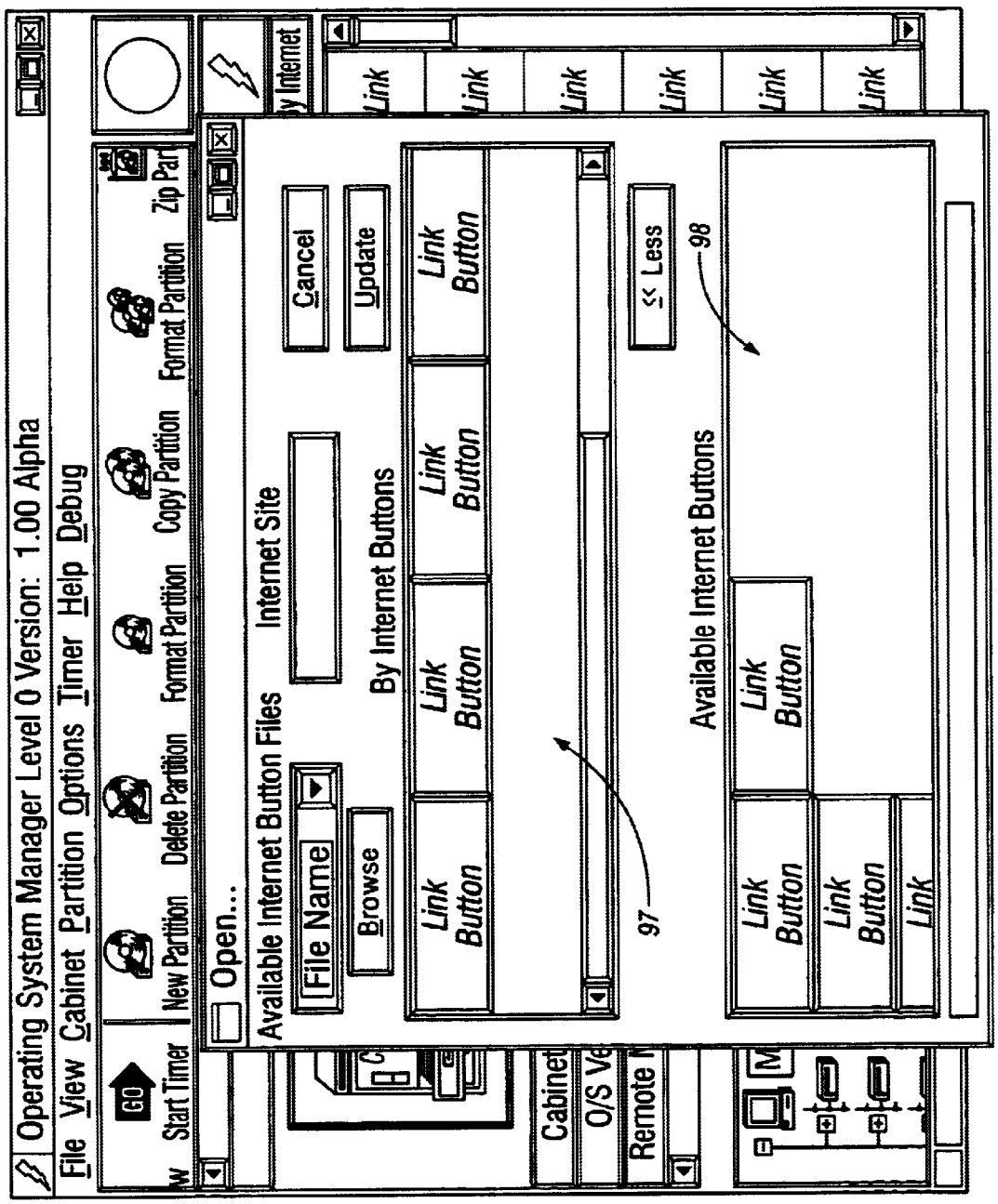
FIG. 14 depicts the Internet Button Editor of the FVOS GUI.

FVIS GUI 10 also features hot links to Internet Sites via Buttons 89 depicted on URL Internet Button Bar 95. Buttons 89 can be added or deleted from URL Internet Button Bar 95 through the Internet Button File Editor Window 96, as depicted in FIG. 14. To delete an Internet button, the user double-clicks the desired button depicted in Active URL Button Window 97. To add an Internet button, the user double clicks the desired button depicted in Available Internet Button Window 98. Buttons 89 may be any Internet URL. In the preferred embodiment, Buttons 89 are manufacturer buttons that can be used for accessing manufacturers WEB sites for downloading and configuring that vendor's cabinet. Vendors, including software and system manufacturers and distributors, can have their own Button 89 to download through the Internet their OS independent applications such as Internet Browser, Online Services, OS Support, Computer Service/Help, Video Conferencing, Data Base access, and turnkey (No-OS) applications for specific services. In the preferred embodiment, Buttons 89 contain an embedded Search Engine and Network Router.

Main Toolbar 65, Cabinet Selection Button Bar 70, Secondary Storage Partitions Window 80, Active Selected Cabinet Visible Partition Window 90 and URL Internet Button Bar are all scrollable by scroll bar sliders, tabs and/or arrows.

We claim:

1. A graphic user interface for displaying means for allocating a computer device's resources to multiple operating system environments, partitioned on individual virtual cabinets, on said computer device, said graphic user interface comprising:

a main menu bar;

a cabinet selection button bar;

said cabinet selection button bar graphically representing at least one virtual cabinet;

each said at least one virtual cabinet representing a discrete operating system;

a secondary storage partitions window;

a cabinet visible partition window;

said secondary storage partitions window graphically illustrating at least one partition of at least one secondary storage device;

said cabinet visible partition window graphically illustrating a cabinet record corresponding to a selected virtual cabinet on said cabinet selection button bar; and each said at least one cabinet visible partition window representing an operating system plus application software, databases and memory configured with said selected virtual cabinet.

2. A graphic user interface as in claim 1, further comprising:

means for manipulating said selected virtual cabinet record through said cabinet visible partition window.

3. A graphic user interface as in claim 2, further comprising:

a main toolbar; and a cabinet properties window.

4. A graphic user interface as in claim 3, further comprising means for designating and illustrating one of said at least one cabinet record as an active selected virtual cabinet.

5. A graphic user interface as in claim 4, further comprising means for designating and illustrating one of said at least one partition in each of said at least one cabinet record as a bootable partition for said at least one cabinet record.

6. A graphic user interface as in claim 4, further comprising a timer window for graphically illustrating a countdown from a modifiable pre-specified number to "0".

7. A graphic user interface as in claim 4, further comprising at least one button associated with an application program that does not require an operating system to be downloaded directly into a memory of said computer device.

8. A graphic user interface as in claim 4, further comprising means for restricting access to sail at least one cabinet record through a password input.

9. A graphic user interface as in claim 4, further comprising means for naming said at least one cabinet record.

10. A graphic user interface as in claim 4, further comprising means for remote management of any of said multiple operating systems.

11. A graphic user interface as in claim 4, further comprising means for allocation of at least one shared partition to more than one of said multiple operating systems in said computer device.

12. A graphic user interface as in claim 4, further comprising means for allocation of at least one shared device to more than one of said multiple operating systems in said computer device.

13. A graphic user interface as in claim 4, further comprising means for portability in operation in said computer device with said multiple operating systems.

14. A graphic user interface as in claim 4, further comprising means for portability in operation of at least one No-OS embedded software application in said computer device.

15. A graphic user interface as in claim 4, wherein said multiple operating system is a super operating system.

16. A graphic user interface for displaying moans for allocating a computer device's resources to at least one operating system on said computer device, said graphic user interface comprising:

a secondary storage partitions window for graphically illustrating each of at least one partition of at least one secondary storage device for each of at least one operating systems on said computer;

means for configuring said at least one partition of said at least one secondary storage device through said secondary storage partitions window;

a cabinet selection button bar;

said cabinet selection button bar graphically representing at least one virtual cabinet record;

each said at least one virtual cabinet record representing a discrete operating system;

a cabinet visible partition window for graphically illustrating a selected virtual cabinet record;

means for manipulating said at least one cabinet record through said cabinet visible partition window;

said cabinet visible partition window graphically illustrating am operating system plus application software, databases and memory configured with said selected virtual cabinet; and means for modifying said at least one cabinet record through said cabinet visible partition window.

17. A graphic user interface as in claim 16, further comprising means fair designating and illustrating one of said at least one cabinet record as an active cabinet.

18. A graphic user interface as in claim 17, further comprising means for designating and illustrating one of said partitions in each of said at least one cabinet record as a bootable partition for said at least one cabinet record.

19. A graphic user interface as in claim 17, further comprising at least one direct button associated with an application program that does not require an operating system to be downloaded directly into a memory of said computer device.

20. A graphic user interface as in claim 17, further comprising means for restricting access to said at least one cabinet record through a password input.

21. A graphic user interface as in claim 17, further comprising means for naming said at least one cabinet record.

22. A graphic user interface as in claim 17, further comprising means for remote management of any of said at least one operating systems.

23. A graphic user interface as in claim 17, further comprising means for allocation of at least one shared partition to more than one of said at least one operating system in said computer device.

24. A graphic user interface as in claim 17, further comprising means for allocation of at least one shared device to more than one of said at least one operating system in said computer device.

25. A graphic user interface as in claim 17, further comprising means for portability in operation is said computer device with said at least one operating system.

26. A graphic user interface as in claim 17, further comprising means for portability in operation of at least one No-OS embedded software applications in said computer device.

27. A graphic user interface as in claim 18, further comprising a timer window for graphically illustrating a countdown from a modifiable pre-specified number to "0".

28. A computer program product for use on a computer system with a memory, a display and multiple operating system, the computer program product comprising a computer usable medium having computer readable program code thereon for generating, a graphic user interface on the display device which facilitates manipulation of operating systems, programs and databases in said multiple operating system, the computer readable program code comprising:

- program code for accessing and displaying each of at least one partition of at least one secondary storage device;
- program code for configuring said at least one partition of said at least one secondary storage device through a secondary storage partitions window;
- program code for displaying a cabinet selection button bar;
- said cabinet selection button bar graphically representing at least one virtual cabinet record;
- each said at least one virtual cabinet record representing a discrete operating system;
- program code for displaying a cabinet visible partition window for graphically illustrating, at least one cabinet record, each of said at least one cabinet record representing an operating system plus application software, databases and memory configured with said selected virtual cabinet record;
- program code for manipulating said virtual cabinet record through said cabinet visible partition window; and
- program code for means for modifying said at least one cabinet record through said cabinet visible partition window.

29. A computer program product as in claim 28, further comprising program code means for designating and illustrating one of said at least one cabinet record as an active cabinet.

30. A computer program product as in claim 29, further comprising program code means for designating and illustrating one of said at least one partition in each of said at least one cabinet record as a bootable partition for said at least one cabinet record.

31. A computer program product as in claim 30, further comprising program code means for displaying a timer window for graphically illustrating a countdown from a modifiable pre-specified number to "0".

32. A computer program product as in claim 30, further comprising program code means for at least one button associated with an application program that does not require an operating system to be downloaded directly into a memory of said computer system.

33. A computer program product as in claim 30, further comprising program code means for restricting access to said at least one cabinet record through a password input.

34. A computer program product as in claim 30, further comprising program code means for naming said at least one cabinet record.

35. A computer program product as in claim 30, further comprising program code means for remote management of any of said multiple operating systems.

36. A computer program product as in claim 30, further comprising program code means for allocation of at least one shared partition to more than one of said multiple operating systems in said computer system.

37. A computer program product as in claim 30, further comprising program code means for allocation of at least one shared device to more than one of said multiple operating systems in said computer system.

38. A computer program product as in claim 30, further comprising program code means for portability in operation in said computer system with said multiple operating systems.

39. A computer program product as in claim 30, further comprising program code means for portability in operation of at least one No-OS embedded software application in said computer system.

* * * * *